United States Patent [19]
Beard

[11] Patent Number: 5,969,502
[45] Date of Patent: *Oct. 19, 1999

[54] BATTERY CHARGER CAPABLE OF INDEPENDENTLY CHARGING ELECTROMAGNETIC CELLS

[75] Inventor: Paul Beard, Milpitas, Calif.

[73] Assignee: Intermec IP Corp., Woodland Hills, Calif.

[ * ] Notice: This patent is subject to a terminal disclaimer.

[21] Appl. No.: 09/167,136

[22] Filed: Oct. 6, 1998

Related U.S. Application Data

[63] Continuation of application No. 08/751,822, Nov. 19, 1996, Pat. No. 5,818,199
[60] Provisional application No. 60/006,966, Nov. 20, 1995.
[51] Int. Cl.$^6$ .................................................. H01M 10/46
[52] U.S. Cl. ............................................................ 320/116
[58] Field of Search ................................. 320/116, 118, 320/119, 120, 121, 126, FOR 104, FOR 105, FOR 111, FOR 112, FOR 114, FOR 129, FOR 138, FOR 147, FOR 150

[56] References Cited

U.S. PATENT DOCUMENTS

| | | | |
|---|---|---|---|
| 5,153,496 | 10/1992 | LaForge | 320/119 |
| 5,218,285 | 6/1993 | Carlton et al. | 320/119 |
| 5,498,950 | 3/1996 | Ovwerkerk | 320/119 |
| 5,547,775 | 8/1996 | Egughi et al. | 320/118 |
| 5,557,189 | 9/1996 | Suzuki et al. | 320/119 |
| 5,773,159 | 6/1998 | Beard | 429/7 |
| 5,818,199 | 10/1998 | Beard | 320/119 |

*Primary Examiner*—Edward H. Tso
*Attorney, Agent, or Firm*—Akin, Gump, Strauss, Hauer & Feld, L.L.P.

[57] ABSTRACT

A current limited rechargeable battery charging apparatus is utilized to charge batteries comprising lithium type electrochemical cells. The charging apparatus of the present invention may be specifically utilized with rechargeable batteries comprising lithium type electrochemical cells utilized in a multiple cell series configuration. The lithium battery may be charge limited float charged such that the charging current does not exceed a predetermined current value. The charge current limiting may be provided without utilizing complex or expensive current control circuitry. The current limited rechargeable battery charging apparatus my be utilized as a part of a battery charging and utilization system implemented with portable electronic devices such that the electronic device may be utilized and the battery may be charged while simultaneously providing operational power and being overcharged protected. An external charging unit may be controlled from a battery pack containing the rechargeable battery and charge control circuitry.

18 Claims, 3 Drawing Sheets

BATTERY CHARGER CAPABLE OF INDEPENDENTLY CHARGING ELECTROMAGNETIC CELLS

CROSS-REFERENCE TO RELATED APPLICATIONS

The present application is a continuation of U.S. Pat. No. 5,818,199 filled Nov. 19, 1996, which claims priority pursuant to 35 U.S.C. Sec. 119(e) to U.S. Provisional Application Ser. No. 60/006,966 (Attorney Docket No. DN38137+), filed Nov. 20, 1995, which is hereby incorporated herein by reference in its entirety. The present application also incorporates herein by reference in their entirety U.S. Provisional Patent Application Ser. No. 60/001,499 (Attorney Docket No. DN38134+), filed Jul. 18, 1995 and U.S. Application Ser. No. 08/687,007 (Attorney Docket No. DN38134R1), filed Jul. 18, 1996.

TECHNICAL FIELD

The present invention relates generally to charging devices for lithium type electrochemical cells and specifically to a current limited charging apparatus for critical charging of lithium batteries or the like.

BACKGROUND OF THE INVENTION

Demand for batteries with higher energy densities at lower costs is fueling the search for alternatives to traditional nickel-cadmium or lead-acid electrochemical cells. For example, nickel-metal hydride electrochemical cells have greater energy densities than nickel-cadmium cells but are correspondingly more expensive. Zinc-air cells offer greater energy densities as well but cannot be rapidly charged and have shorter operational life spans. Lithium-ion type cells are compact, light, offer high energy densities, have a high discharge voltage and exhibit stable discharge characteristics. Lithium-ion cells are well suited to applications requiring current draw for extended periods of time and are relatively inexpensive.

Traditionally, lithium type batteries have not been widely utilized as a main power source in the portable electronics industry because of the inherent characteristics of lithium electrochemical cells that present engineering difficulties. Effective and efficient charging of lithium cells, especially when utilized in a series configuration, is often difficult to accomplish. Manufacturers of lithium type electrochemical cells typically dictate stringent charging conditions to maximize the charge and to prevent damage caused by overcharging. The maximum charge voltage and current applied to the cells must be limited to predetermined levels.

Additionally, lithium electrochemical cells are susceptible to self-discharge due to the internal presence of hydrogen in the electrochemical cells. For example, when a battery pack comprises multiple series connected lithium cells, the voltages of the cells are typically mismatched due to the varying presence of internal hydrogen. This voltage mismatch causes the battery pack voltage to be lower than its nominal value and results in rapid loss of electric charge. During charging of the battery, the charging process may completely charge some of the cells and completely discharge other cells. The mismatched cells ultimately fail and thereby cause the instability and premature failure of the battery pack. Additionally, because some of the lithium cells are completely charged while others are discharged, the resulting total series voltage of the lithium cells is less than the nominal fully charged voltage of the battery back thereby causing the battery pack to be overcharged. Overcharging of the battery pack ultimately leads to premature failure and may possibly result in a fire or explosion of the electrochemical cells.

It is for these mentioned reasons that lithium electrochemical cells have not been widely utilized as the main power source in portable battery powered electronic equipment. The charging process is complex and requires that the charging process is carefully monitored and controlled so that the charging voltage and current is strictly limited. Additionally, the lithium battery charging apparatus must account for any voltage mismatch between each of the individual cells. Thus, the battery charger and battery pack typically requires complicated construction and complex, expensive charging circuitry.

SUMMARY OF THE INVENTION

The present invention provides simple, effective, efficient, and low cost charging of lithium-ion type electrochemical cells in a portable battery powered electronic system. The charging current and voltage are efficiently limited and controlled within the stringent limits dictated by lithium cell manufacturers. A cell balancing circuit may be utilized which provides voltage equalization of the cell output voltages during charging in conjunction with the current and voltage limiting features of the present invention.

The charging apparatus of the present invention may be specifically utilized with rechargeable batteries comprising lithium type electrochemical cells utilized in a multiple cell series configuration. The lithium battery may be charge limited float charged such that the charging current does not exceed a predetermined current value. The charge current limiting may be provided without utilizing complex or expensive current control circuitry. The current limited rechargeable battery charging apparatus my be utilized as a part of a battery charging and utilization system implemented with portable electronic devices such that the electronic device may be utilized and the battery may be charged while simultaneously providing operational power and being overcharged protected. An external charging unit may be controlled from a battery pack containing the rechargeable battery and charge control circuitry.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
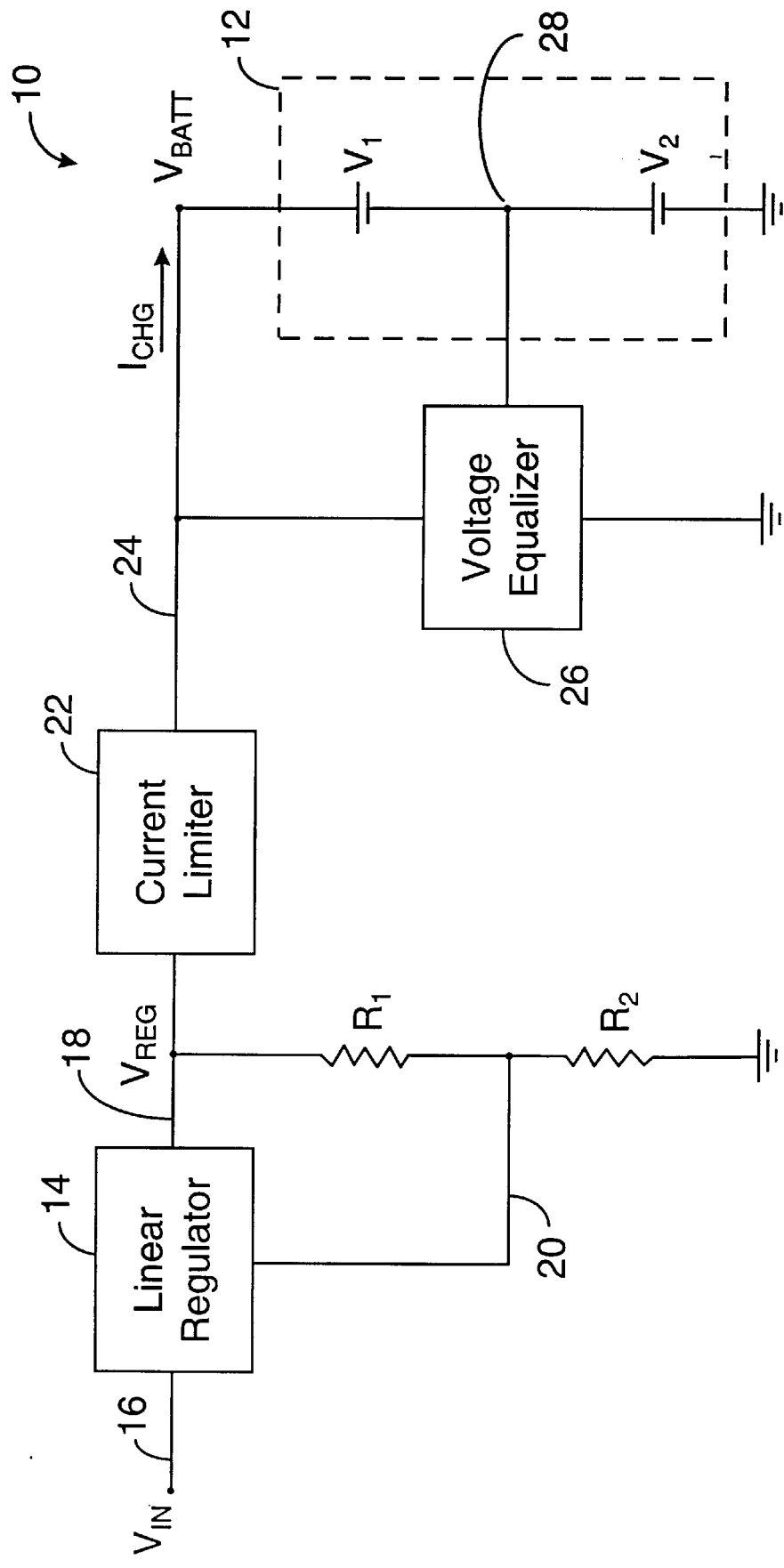
FIG. 1 is a schematic diagram of a current limited lithium battery charging apparatus of the present invention.

FIG. 1 illustrates schematically a current limited lithium battery charging apparatus of the present invention. The problem which the present invention solves is effective and efficient charging of lithium batteries which comprise lithium type electrochemical cells especially when utilized in a series configuration. Lithium batteries require stringently controlled charging conditions including limiting the maximum charge voltage and current applied to the cells. The lithium battery system 10 typically includes a lithium battery 12 and accompanying charge control electronics. The lithium battery 12 may comprise two individual lithium type electrochemical cells $V_1$ and $V_2$ electrically connected in series to achieve a battery output voltage $V_{BATT}$ which is the sum of the output voltages of each individual cell $V_1$ and $V_2$.

During the charging cycle, the lithium battery system 10 receives a direct current input charge voltage $V_{IN}$ which provides the electrical energy to charge the lithium battery 12. The charge input voltage $V_{IN}$ from typical supply sources may drift over a wide voltage range that is too unregulated to properly and effectively charge the battery 12. In a preferred embodiment of the present invention, the cells $V_1$ and $V_2$ are vanadium-lithium cells having a nominal output voltage of 3.4 volts per cell when fully charged requiring the charging voltage $V_{IN}$ to be at least 6.8 volts in order to fully charge the battery 12. The charge voltage $V_{IN}$ will typically be higher than 6.8 volts to compensate for any voltage drops from the voltage and current regulating circuits.

The charging input voltage $V_{IN}$ is preferably amplitude regulated with a linear voltage regulator ("LINEAR REGULATOR") 14 to provide a voltage regulated charging voltage to the battery 12 with no voltage drift. The voltage regulator 14 preferably produces a 6.8 volt regulated voltage $V_{REG}$ at the output 18 of the regulator 14 to charge the vanadium-lithium cells $V_1$ and $V_2$. To achieve a regulated output $V_{REG}$ of 6.8 volts typically requires the voltage $V_{IN}$ at the input of the regulator 16 to range from 8.0 volts to 9.6 volts. A reference signal 20 proportional to the regulated output voltage $V_{REG}$ typically may be fed back to the regulator 14 via a voltage divider comprising resistors $R_1$ and $R_2$.

The regulated charging signal $V_{REG}$ preferably feeds through a charge current limited ("CURRENT LIMITER") 22 the output of which 24 charges the battery 12 at positive battery terminal node 24. Preferably, the lithium type electrochemical cells are current limited float charged in that the charging current $I_{CHG}$ may not exceed 4.0 milliamperes. If the charging current $I_{CHG}$ were to exceed 4.0 milliamperes then the batteries would be susceptible to being damaged from the charging process. Thus, the linear voltage regulator 14 preferably provides a constant, drift fee charging voltage $V_{REG}$ to the lithium battery 12 with the charging current $I_{CHG}$ being limited by the current limiter 22.

Lithium type electrochemical cells further require cell balancing techniques when being charged to prevent any voltage mismatch on the cells. A voltage equalizer ("VOLTAGE EQUALIZER") 26 preferably connects at the node 28 between the cells $V_1$ and $V_2$ and the charge input node 24 and is utilized to balance the cell voltage during charging. Exemplary voltage equalizing circuits for multi-cell lithium battery applications are described in U.S. Provisional Patent Application Ser. No. 60/001,499 (Attorney Docket No. DN38134+), filed Jul. 18, 1995 and U.S. Patent Application Ser. No. 08/687,007 (Attorney Docket No. DN38134R1), filed Jul. 18, 1996, both of which are incorporated herein in their entirety.

Figure 2:
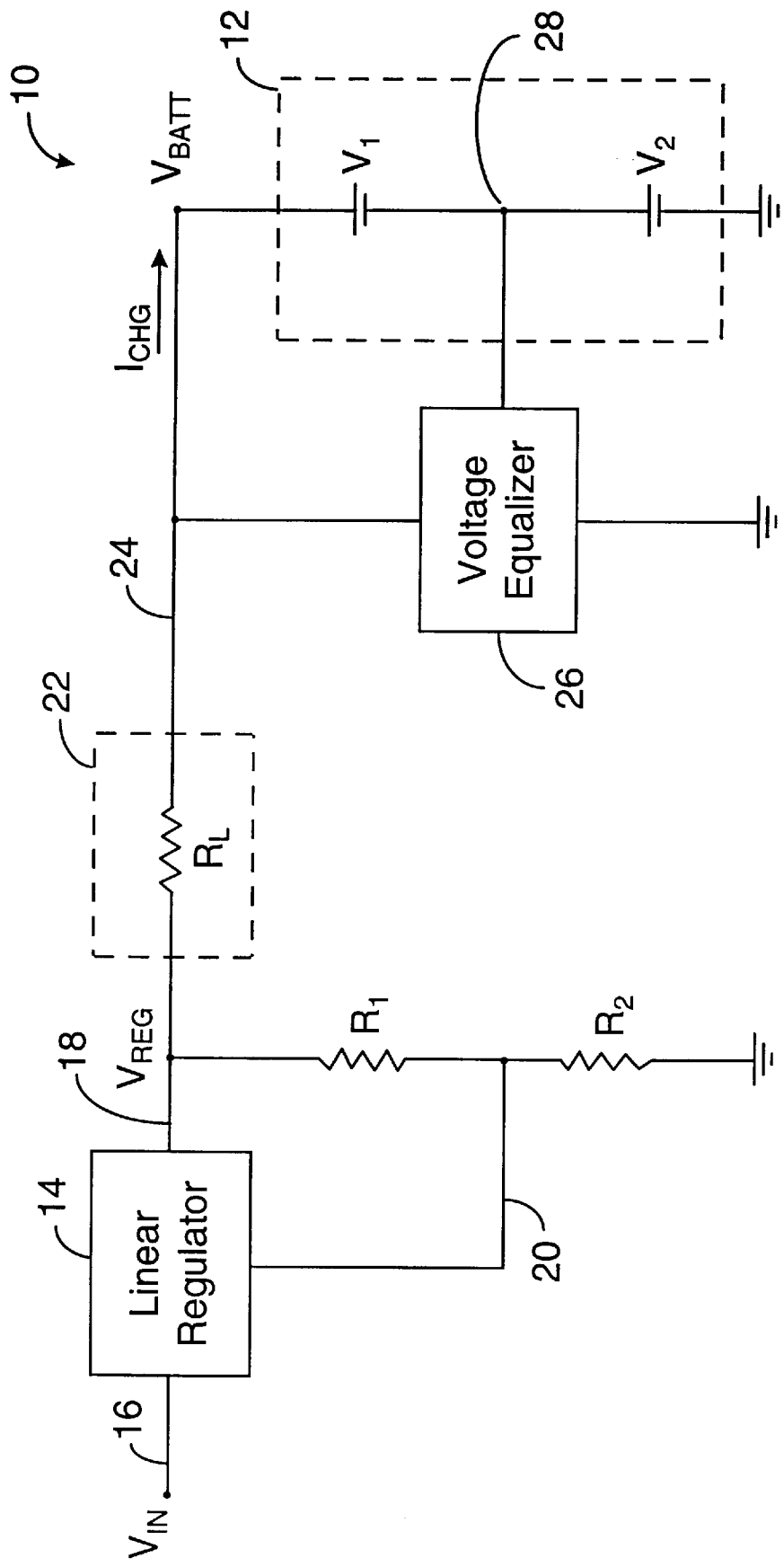
FIG. 2 is a schematic diagram of the current limited lithium battery charging apparatus of the present invention illustrating a preferred embodiment thereof.

FIG. 2 illustrates a preferred current limited battery charging apparatus of the present invention. The lithium battery system 10 of the present invention preferably utilizes vanadium-lithium electrochemical cells producing an output voltage of 3.4 volts per cell when fully charged and an output voltage of 3.0 volts per cell when discharged. Thus, the battery output voltage $V_{BATT}$ ranges from 6.0 volts when discharged to 6.8 volts when fully charged. The battery charging current $I_{CHG}$ must be limited to a maximum of 4.0 milliamperes. The battery 12 will sink the most charging current when discharged and preferably will sink no current when fully charged. By analysis of the node voltages at nodes 18 and 24, the impedance of the current limiter 22, $Z_{CL}(t)$, may be described as:

$$Z_{CL}(t)=[V_{REG}(t)-V_{BATT}(t)]/I_{CHG}(t)$$

With the battery 12 fully discharged at t=0 seconds and the limiting conditions of a maximum charging current of 4.0 milliamperes, the impedance of the current limiter 22 becomes:

$$Z_{CL}=[6.8 \text{ volts}-6.0 \text{ volts}]/4.0 \text{ milliamperes}=200 \text{ ohms}$$

Thus, a linear impedance, such as a current limiting resistor $R_L$, is the preferred implementation of the charge limiting function of the current limiter 22. The current limiting resistor $R_L$ preferably has a value of 200 ohms when two vanadium-lithium cells are utilized in a mutlicell series configuration. Since the linear regulator 14 always produces an output voltage of 6.8 volts at node 18, and because the output voltage $V_{BATT}$ of the battery 12 is 6.0 volts when discharged, the charge current $I_{CHG}$ will be limited to a maximum of 4.0 milliamperes. Utilization of resistor $R_L$ as a current limiter eliminates the need for complex and expensive linear integrated circuitry to perform the current limiting functions which is normally required with the stringent and complex charging requirements of lithium type batteries.

Figure 3:
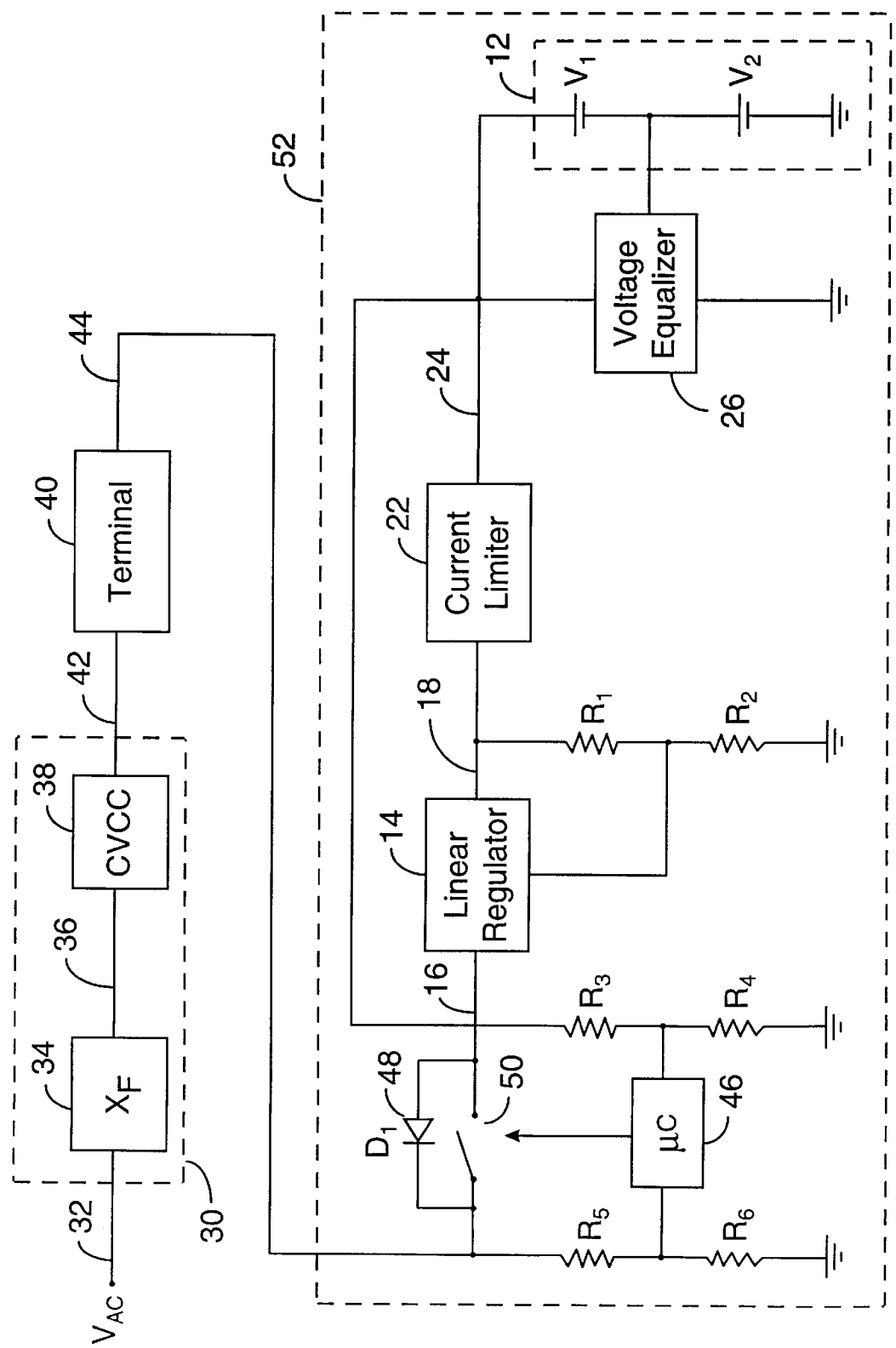
FIG. 3 is a schematic diagram of a current limited battery charging system of the present invention for utilization in conjunction with a portable electronic device.

FIG. 3 illustrates the lithium battery charging apparatus of the present invention utilized with a portable electronic device. The lithium battery 12 of the present invention is suitable for utilization in portable electronic devices such as hand-held portable data collection terminals, for example. Hand-held portable data terminals are typically utilized in warehouse, product delivery and route accounting applications wherein the terminal is utilized for several hours at a time before the battery is able to be recharged. Additionally, hand-held data terminals typically utilize increasingly powerful integrated electronic circuitry having greater power requirements as a result. Lithium type cells, once avoided by engineers because of technically difficult charging and discharging requirements, are now becoming embraced as higher power replacements to traditional nickel-cadmium and nickel-metal hydride batteries. Thus, the battery charging system may be implemented with a hand-held portable data terminal system.

Battery charging apparatuses normally require bulky and heat generating power conditioning electronics. Because reduced size and increased portability of the hand-held data terminal are important design considerations, bulky battery charging apparatuses are preferably not designed as a part of the terminal. The present invention utilizes a battery charging unit 30 external to the terminal 40. The charging unit 30 preferably receives at its input 32 an alternating current (ac) voltage VAC such as typical household and office electrical power. The charging unit 30 preferably includes a power transforming and rectifying circuitry ("$X_F$") 34 which transforms the ac power into a stepped down direct current (dc) voltage suitable for powering the terminal 40 and for recharging the battery 12. Further power conditioning circuitry ("CVCC") 38 receives the dc voltage at its input 36 to maintain the dc voltage at a constant voltage and constant current which are preferably always less than 8.4 volts and 1.0 amperes in a preferred embodiment of the present invention.

The charging unit 30 provides operational power to the terminal 40 at its power input 42. The dc power signal preferably passes through the terminal 40 to charge the battery 12, which is preferably utilized in a self-contained battery pack 52, via power input line 44. The battery pack 52 is designed to be utilized in conjunction with terminal 40 and preferably includes the lithium battery 12 and operational circuitry of the present invention. The dc power signal is delivered to the battery pack 52 via input line 44 form the terminal 40 and passes through a charge control switch 50 which controls the flow of power into and out of the battery pack 52. In a preferred embodiment of the present invention the charge control switch is a p-channel field-effect transistor.

When the charging switch 50 is closed the dc power signal from the charging unit 30 may flow into the battery pack 52 and thereby charge the battery 12. When the charging switch 50 is open, the charging control unit 30 is thereby prevented from delivering power to the battery 12. A diode 48 connected in parallel with charging switch 50 allows for only unidirectional flow of current when the charging switch 50 is open. In this arrangement, the battery 12 may deliver power to the terminal 40 while power is prevented from being delivered to the battery 12 to prevent overcharging. The thus described power control arrangement is especially applicable to protect the battery 12 from accidental overcharging when the terminal 40 is being utilized and the battery 12 is being charged simultaneously. The battery 12 may provide operational power to the terminal 40 during simultaneous charging while being protected from overcharging.

The operational functions of the battery pack 52 are preferably controlled with a microcontroller ("$\mu C$") 46 contained therein. The microcontroller 46 monitors and controls the flow of power into and out of the battery pack 52 and controls the charging of the battery 12. The microcontroller 46 measures the input voltage received by the battery pack 52 from line 44 through resistors $R_5$ and $R_6$. The microcontroller 46 also monitors the output voltage of the battery 12 at node 24 through resistors $R_3$ and $R_4$. Through proportional scaling of the voltages through voltage dividers formed by resistors $R_5$ and $R_6$ and resistors $R_3$ and $R_4$, the microcontroller 46 essentially charges battery 12 until the input voltage at line 44 equals the output voltage of the battery 12 at node 24.

The manner, routine and rate of charging of the battery 12 is preferably controlled by the microcontroller 46 via the switching on and off of charge control switch 50. With the preferred charge control arrangement of the present invention thus described, the microcontroller 46 of the battery pack 52 controls the output of the external charging unit 30 without requiring any charging control circuitry to be physically located within the charging unit 30 and without requiring the charging unit 30 to be located within the terminal 40 or within the battery pack 52 and generate heat and occupy precious space. Further, no control signal is required to be passed from the battery pack 52 or the terminal 40 to the charge unit 30 to control the charging function, further eliminating the need for the utilization of control lines in addition to the power supply line 44.

In view of the above detailed description of a preferred embodiment and modifications thereof, various other modifications will now become apparent to those skilled in the art. The contemplation of the invention below encompasses the disclosed embodiments and all reasonable modifications and variations without departing from the spirit and scope of the invention.

I claim:

1. A battery charging and utilization system comprising:
   an electronic device;
   a power unit, external to the electronic device, that delivers power to the electronic device when the power unit is coupled to the electronic device;
   a battery pack, removably insertible into the electronic device, comprising charging circuitry and at least two electrochemical cells arranged in a series configuration to deliver power to the electronic device when the electronic device is not coupled to the power unit;
   the charging circuitry including a current regulator coupled in series with the at least two electrical cells; and
   the charging circuitry independently controlling charging of each of the at least two electrochemical cells from power provided by the power unit when the electronic device is coupled to the power unit.

2. The battery charging and utilization system of claim 1 wherein the charging circuitry of the battery pack attempts to prevent overcharging of either of the at least two electrochemical cells while attempting to fully charge both of the at least two electrochemical cells.

3. The battery charging and utilization system of claim 2 wherein the at least two electrochemical cells comprise lithium type cells.

4. The battery charging and utilization system of claim 2 wherein the charging circuitry comprises a voltage equalizer.

5. The battery charging and utilization system of claim 2 wherein the charging circuitry simultaneously charges the at least two electrochemical cells while in the series configuration via access to a node formed between the at least two electrochemical cells.

6. The battery charging and utilization system of claim 5 wherein the battery pack and power unit attempt to provide continuous power delivery to the electronic device while either the battery pack or the power unit couples or uncouples from the electronic device.

7. A battery system for an electronic device comprising:
   a power unit, external to the electronic device, that delivers power to the electronic device when coupled thereto; and
   a battery pack, configured to be removably inserted into the electronic device, comprising:
   at least two electrochemical cells arranged in a series configuration to deliver power to the electronic device when the electronic device is not coupled to the power unit, the series configuration forming at least one intermediate node;
   charging circuitry, coupled to the at least two electrochemical cells and the at least one intermediate node, that independently controls charging of each of the at least two electrochemical cells from power provided by the power unit when the electronic device is coupled to the power unit; and
   the charging circuitry including a voltage equalizer.

8. The battery system of claim 7 wherein the charging circuitry attempts to prevent overcharging of any of the at least two electrochemical cells while attempting to fully charge all of the at least two electrochemical cells.

9. The battery system of claim 7 wherein the at least two electrochemical cells comprise lithium type cells.

10. The battery system of claim 7 wherein the charging circuitry includes a current regulator coupled in series with the at least two electrochemical cells.

11. The battery system of claim 7 wherein the charging circuitry simultaneously charges the at least two electrochemical cells while in the series configuration via access to the at least one node.

12. The battery system of claim 7 wherein the battery pack and power unit attempt to provide continuous power delivery to the electronic device while either the battery pack or the power unit couples or uncouples from the electronic device.

13. A battery system for an electronic device comprising:
 a power unit, external to the electronic device, that delivers power to the electronic device when coupled thereto; and
  a battery pack, configured to be removably inserted into the electronic device, comprising:
   at least two electrochemical cells arranged in a series configuration to deliver power to the electronic device when the electronic device is not coupled to the power unit;
   charging circuitry, coupled to the at least two electrochemical cells, that independently controls charging of each of the at least two electrochemical cells from power provided by the power unit when the electronic device is coupled to the power unit; and
   the charging circuitry including a current regulator coupled in series with the at least two electrochemical cells.

14. The battery system of claim 13 wherein the charging circuitry attempts to prevent overcharging of any of the at least two electrochemical cells while attempting to fully charge all of the at least two electrochemical cells.

15. The battery system of claim 12 wherein the at least two electrochemical cells comprise lithium type cells.

16. The battery system of claim 12, further comprising:
 the series configuration of the at least two electrochemical cells forming at least one intermediate node; and
 the charging circuitry including a voltage equalizer coupled to the at least two electrochemical cells and the at least one intermediate node.

17. The battery system of claim 12 wherein the charging circuitry simultaneously charges the at least two electrochemical cells while in the series configuration via access to the at least one node.

18. The battery system of claim 12 wherein the battery pack and power unit attempt to provide continuous power delivery to the electronic device while either the battery pack or the power unit couples or uncouples from the electronic device.

* * * * *